US012489255B2

(12) United States Patent
Morgan et al.

(10) Patent No.: US 12,489,255 B2
(45) Date of Patent: Dec. 2, 2025

(54) ELECTRICAL CONNECTOR USING TUNABLE HOT MELT ADHESIVE MATERIAL

(71) Applicant: TE Connectivity Solutions GmbH, Schaffhausen (CH)

(72) Inventors: Chad William Morgan, Carneys Point, NJ (US); Bruce Allen Champion, Camp Hill, PA (US); David Patrick Orris, Middletown, PA (US); Jessica H B. Hemond, Mifflintown, PA (US); Megan Hoarfrost Beers, Redwood City, CA (US); Aakriti Kharel, San Jose, CA (US); Jason Thomas Chiota, Redwood City, CA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 326 days.

(21) Appl. No.: 18/295,871

(22) Filed: Apr. 5, 2023

(65) Prior Publication Data

US 2024/0339789 A1 Oct. 10, 2024

(51) Int. Cl.

*H01R 13/66* (2006.01)
*C09J 7/35* (2018.01)
*H01R 13/639* (2006.01)
*H01R 13/6591* (2011.01)

(52) U.S. Cl.

CPC ............ *H01R 13/6658* (2013.01); *C09J 7/35* (2018.01); *H01R 13/639* (2013.01); *H01R 13/65912* (2020.08); *C09J 2203/326* (2013.01); *C09J 2301/304* (2020.08); *C09J 2301/312* (2020.08); *C09J 2301/408* (2020.08)

(58) Field of Classification Search

CPC ...................... H01R 13/6658; H01R 13/65912
See application file for complete search history.

(56) References Cited

U.S. PATENT DOCUMENTS

| | | | | |
|---|---|---|---|---|
| 4,445,742 A * | 5/1984 | Fullam | H01R 13/112 | 439/597 |
| 4,579,404 A * | 4/1986 | Lockard | H01R 12/75 | 439/736 |
| 5,364,292 A * | 11/1994 | Bethurum | H01R 13/6599 | 439/607.02 |

(Continued)

OTHER PUBLICATIONS

Latko-Duralek et al., "Relationship between Viscosity, Microstructure and Electrical Conductivity in Copolyamide Hot Melt Adhesives Containing Carbon Nanotubes", Materials Science and Engineering, Oct. 9, 2020.

(Continued)

*Primary Examiner* — Neil Abrams

(57) ABSTRACT

An electrical connector assembly having a printed circuit board, signal wires, and an impedance mold. The signal wires transmit signals at a determined signal speed. The signal wires have ends which are connected to the printed circuit board. The impedance mold cooperates with the printed circuit and the signal wires. The impedance mold is formed from a tunable hot melt adhesive composition. A dielectric constant of the tunable hot melt adhesive composition is adjusted to be compatible with the desired signal performance characteristics of the signals transmitted over the signal wires to the printed circuit board.

20 Claims, 5 Drawing Sheets

(56) References Cited

U.S. PATENT DOCUMENTS

| | | | | |
|---|---|---|---|---|
| 5,955,703 | A | 9/1999 | Daly et al. | |
| 6,814,588 | B1 * | 11/2004 | Dunlavy | H01R 13/405 439/493 |
| 6,976,869 | B1 * | 12/2005 | Wu | H01R 9/03 439/499 |
| 7,168,984 | B2 * | 1/2007 | Perle | H01R 13/5845 439/606 |
| 7,607,948 | B1 | 10/2009 | Lee | |
| 8,106,298 | B2 | 1/2012 | Tiel et al. | |
| 10,199,141 | B2 * | 2/2019 | Chin | H01R 13/6599 |
| 2003/0176085 | A1 * | 9/2003 | Laker | H01R 13/65912 439/76.1 |
| 2004/0152363 | A1 | 8/2004 | Ozai et al. | |
| 2004/0229510 | A1 | 11/2004 | Lloyd et al. | |
| 2023/0077720 | A1 | 3/2023 | Rossman et al. | |
| 2024/0413593 | A1 * | 12/2024 | Orris | H01R 13/6477 |

OTHER PUBLICATIONS

Wang et al., “Low Dielectric Constant Polymers for High Speed Communication Network”, Advanced Industrial and Engineering Polymer Research, Oct. 15, 2020.

Wang et al., “Progress on Polymer Composites With Low Dielectric Constant and Low Dielectric Loss for High-Frequency Signa; Transmission”, Frontiers in Materials, Oct. 19, 2021.

* cited by examiner

ELECTRICAL CONNECTOR USING TUNABLE HOT MELT ADHESIVE MATERIAL

FIELD OF THE INVENTION

The present invention relates to dielectric modified tunable hot melt adhesive material which enables better matching between electrical components. In particular, the invention is directed to a connector which includes hot melt adhesive material with tunable dielectric constant.

BACKGROUND OF THE INVENTION

With the recent rapid increase in the speed and amount of data transmission, reductions in size and weight and increases in the speed of electronic devices is often required. For such devices, electrical insulating materials with targeted dielectric constants that can accommodate high speed connector designs are beneficial. However, current compositions used to interconnect different electrical components are currently not able to provide targeted or tunable dielectric constants to better match the dielectric contact of the components. Thus, there is a need for a simple hot melt adhesive which can be tunable to a desired dielectric constant or dissipation factor to enable better impedance matching between electrical components.

SUMMARY OF THE INVENTION

An embodiment is directed to an electrical connector assembly having a printed circuit board, signal wires, and an impedance mold. The signal wires transmit signals at a determined signal speed. The signal wires have ends which are connected to the printed circuit board. The impedance mold cooperates with the printed circuit and the signal wires. The impedance mold is formed from a tunable hot melt adhesive composition. A dielectric constant of the tunable hot melt adhesive composition is tuned to have a higher dielectric constant than the base material to be compatible with the desired signal performance characteristics of the signals transmitted over the signal wires to the printed circuit board.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
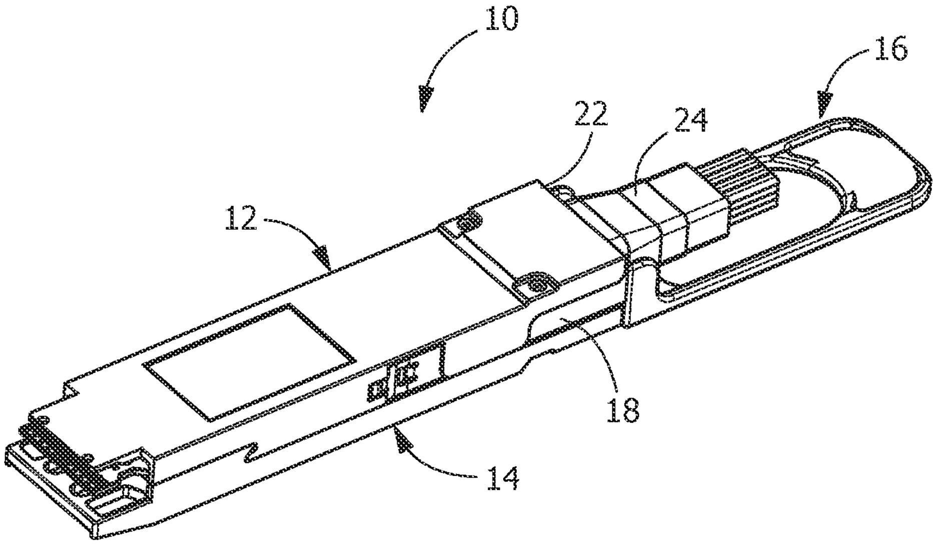
FIG. 1 is a perspective view of an illustrative electrical connector with insulated wires electrically connected to a printed circuit board with the use of a hot melt material which can be tuned to a desired dielectric constant.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 2:
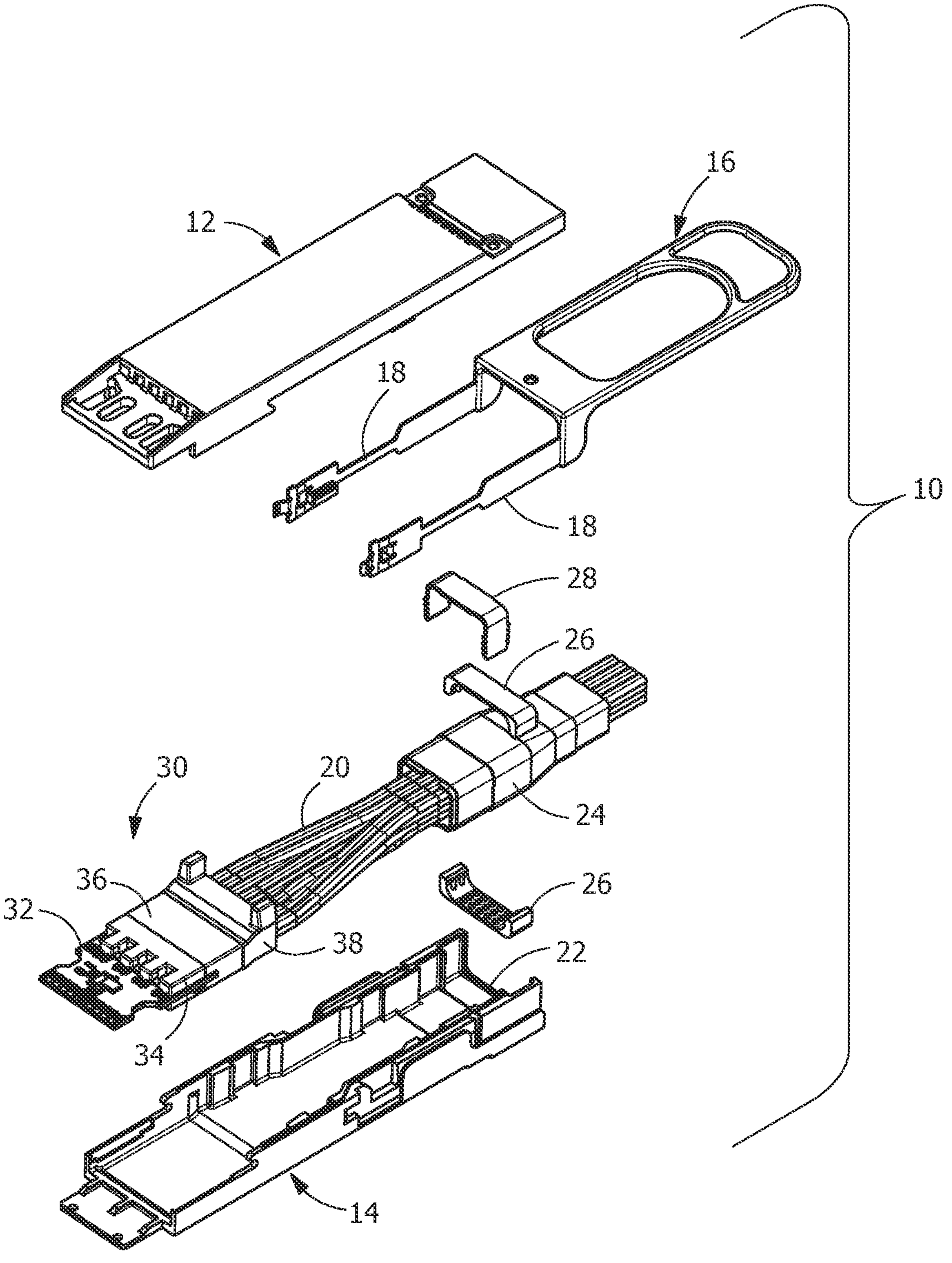
FIG. 2 is an exploded view of FIG. 1.

As shown in FIGS. 1 and 2, an illustrative embodiment of an electrical connector assembly 10 includes a first housing shell 12 and a second housing shell 14. The housing shells 12, 14 are diecast from material having the desired mechanical and electrical characteristics. In other embodiments, the housing shells 12, 14 may be molded. The housing shells 12, 14 mate together to encase the internal components of the connector assembly 10.

A pull tab 16 extends from the back of the housing shells 12, 14. The pull tab 16 is molded from rubber or other material having the desired characteristics. The pull tab 16 has cover mounting legs 18 which are cooperate with one or more of the housing shells 12, 14 to retain the pull tab 16 in engagement with the housing shells 12, 14 and the connector assembly 10.

Ends of wires 20 are provided in the connector assembly 10 between the housing shells 12, 14. The wires extend through a back surface 22 of the connector assembly 10. A wire positioning housing 24 is provided at the back surface 22 of the connector assembly 10 to properly position and secure the wires 20 in the connector assembly 10. Strain relief members 26 are also positioned proximate the back surface 22 to prevent the transfer of stresses applied to the wires 20 from being transferred into the connector assembly 10. Strain relief securing members 28 facilitate the positioning and operation of the strain relief members 26.

As shown in FIGS. 2 through 5, the connector assembly 10 has internal assembly or paddle part 30 to which the wires 20 are electrically connected. The internal assembly 30 includes a dual sided printed circuit board 32, an impedance mold 34, an immobilization mold 36 and a strain relief mold 38.

The circuit board 32 has signal receiving pads 40, ground planes 42, ground rake receiving through holes 44 (FIG. 8) and vias 46. The circuit board 32 is constructed having signal and ground layers in a manner known in the industry.

Figure 4:
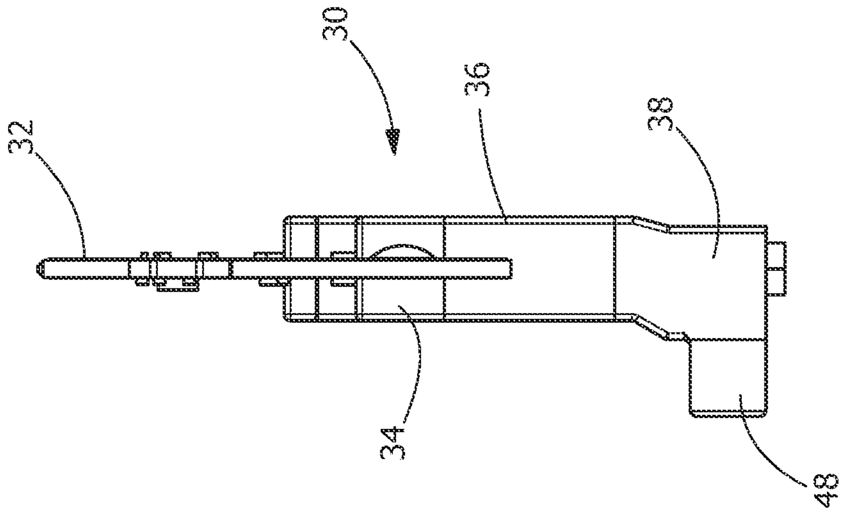
FIG. 4 is a side view of the internal components of the connector shown in FIG. 3.
Figure 3:
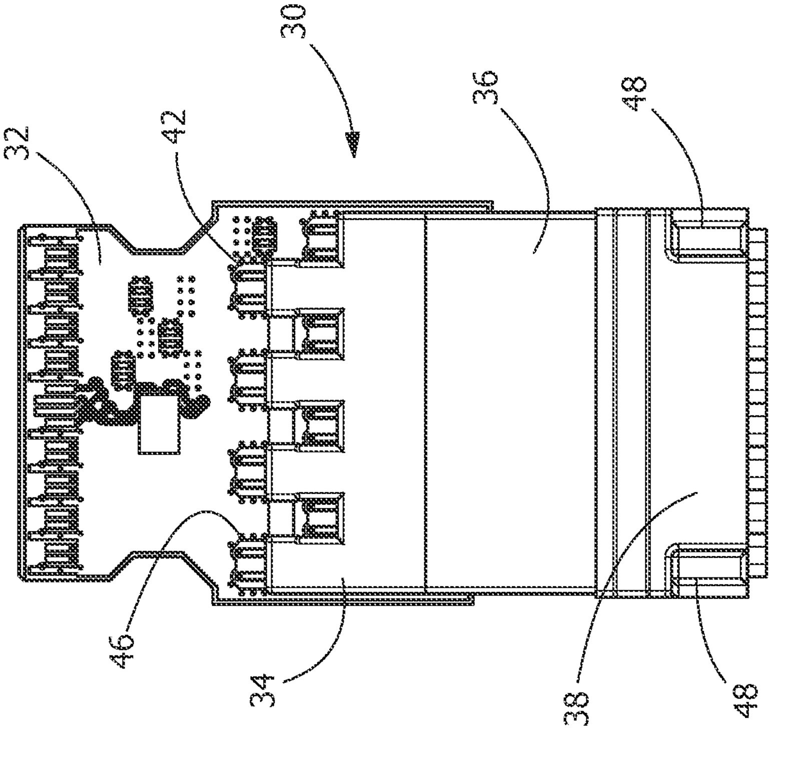
FIG. 3 is a partial top view of the connector of FIG. 1 with the cover removed to illustrate the internal components of the connector.
Figure 5:
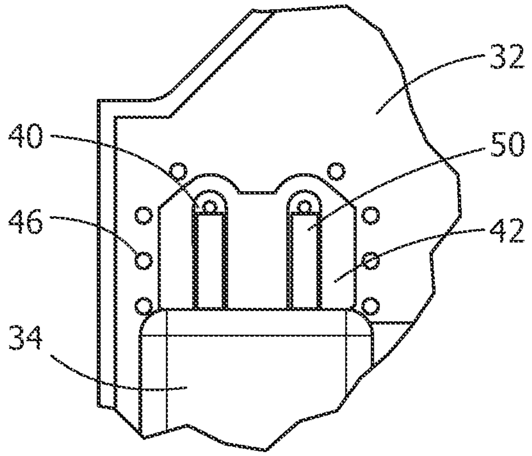
FIG. 5 is an enlarged view of an area in FIG. 3 showing the tunable hot melt material positioned over the interconnect between one of the wires and the printed circuit board.
Figure 6:
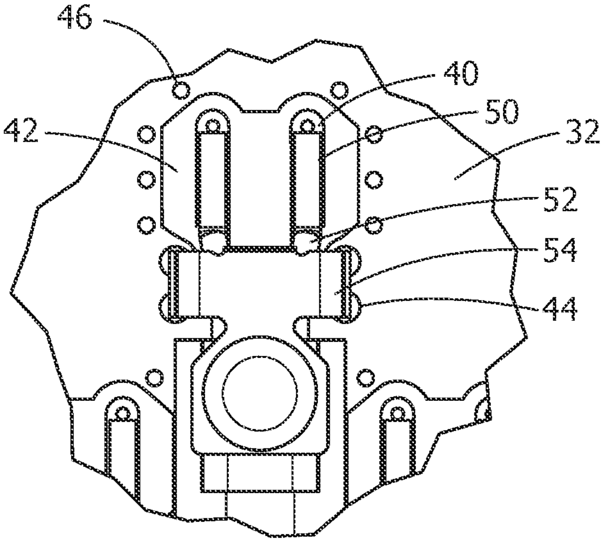
FIG. 6 is an enlarged view similar to FIG. 5 prior to the tunable hot metal material being positioned over the wires and the printed circuit board.
Figure 7:
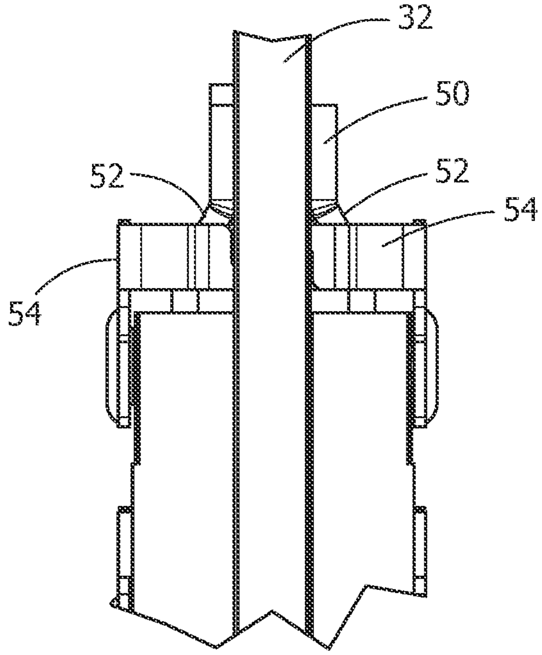
FIG. 7 is a side view of FIG. 6.

The immobilization mold 36 is made from a base hot melt composition or other type of material which is molded over the ends of the wires 20 to retain the wires 20 in position. The immobilization mold 36 encapsulates a portion of the circuit board 32, as shown in FIG. 4 to ensure that the wires 20 are retained in proper position on the circuit board 32.

In the illustrative embodiment shown, the strain relief mold 38 is positioned adjacent the immobilization mold 36 and is molded over the ends of the wires 20. The strain relief mold 38 is molded from plastic or other materials which have the strength characteristics desired. Stabilization projections 48 extend from a surface of the strain relief mold 38. The stabilization projections 48 cooperate with one or more of the housing shells 12, 14 to secure and retain the strain relief mold 38 and the internal assembly 30 in proper position in the connector assembly 10.

Figure 8:
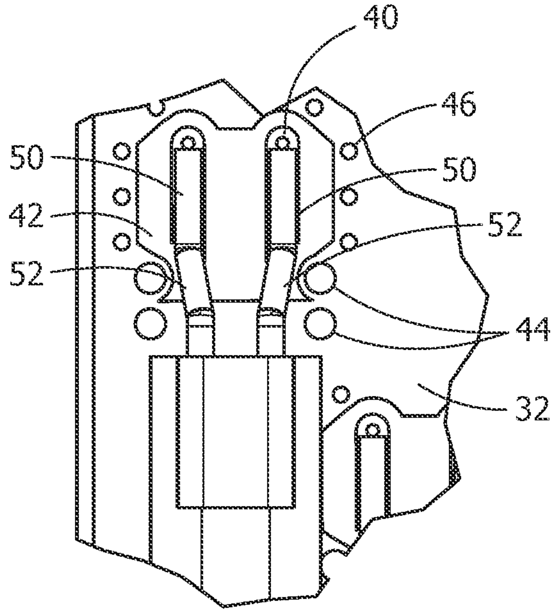
FIG. 8 is an enlarged view similar to FIG. 6 with the ground rake removed.
Figure 9:
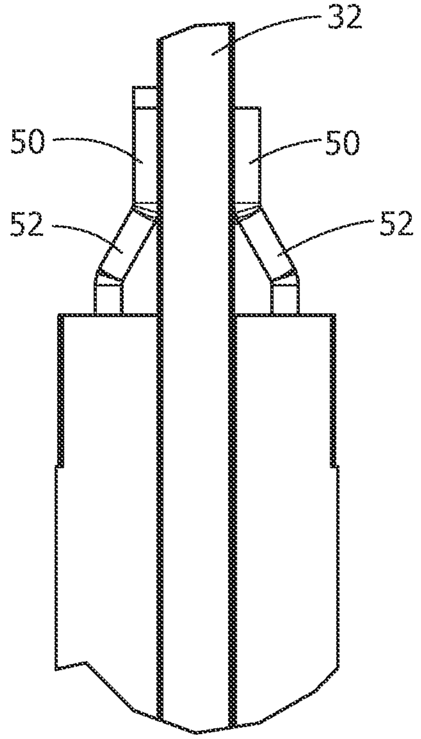
FIG. 9 is a side view of FIG. 8.

The wires 20 have exposed ends 50 which are mounted to the signal receiving pads 40 of the circuit board 32. In the illustrative embodiment shown, each wire 20 has a differential pair of signal conductors which are mounted to the signal receiving pads 40, as shown in FIGS. 8 and 9. The ends 50 have a bent portion 52 which allows the ends 50 to be mounted to be in a different plane removed from the longitudinal axes of the wires 20. The ends 50 may be mounted using solder or other known mounting methods.

With the ends 50 properly mounted to the signal receiving pads 40 of the circuit board 32, ground members or rakes 54 are positioned over the portions of the insulated wires 20 and over the bent portions 52 of the ends 50 of the wires 20. The ground members or rakes 54 are mounted and secured to the ground rake receiving through holes 44 by means of solder or other known mounting methods.

In the illustrative embodiment shown, the impedance mold 34 is positioned adjacent the immobilization mold 36. With the ground members or rakes 54 properly mounted, the impedance mold 34 is molded over and flows between the ground rakes 54 and the bent portions 52 of the ends 50 of the wires 20. The impedance mold 34 encapsulates the ground rakes 54 and the bent portions 52 of the ends 50 of the wires 20

The impedance mold 34 is made from a tunable hot melt adhesive composition which enables better matching of the electrical properties between the wires 20 and the printed circuit board 32. The electrical properties include, but are not limited to, necessary signal performance characteristics, including but not limited to impedance, propagation delay and crosstalk targets transmitted over and near the differential pair of signal conductors which are mounted to the signal receiving pads 40.

The key to the tunable hot melt adhesive composition is to provide a hot melt adhesive composition in which the properties can be varied to achieve the desired result. The tunable hot melt adhesive composition can be formed from a thermoplastic or thermoset polymer. The tunable hot melt adhesive composition should have suitable rheological behavior in which the adhesive flow can be controlled for connector application while still maintaining the desired electrical properties without degradation of the material. The viscosity of the tunable hot melt adhesive is about 5 to about 100 Pa·s at a shear rate of about 1 to about 100 $s^{-1}$. In one embodiment, to provide the desired flow, the tunable hot melt adhesive composition was required to have a viscosity of less than 13.0 Pa·s at 190° C. In another embodiment, the tunable hot melt adhesive can be processed in the temperature range of about 190° to about 210° C. In yet another embodiment, the tunable hot melt can be processed at a temperature below 230° C.

Preferably using the instant invention, the dielectric constant of the tunable hot melt adhesive composition can be modified or adjusted from its neat composition to obtain the desired dielectric constant in the final composition. In one embodiment, the dielectric constant of the tunable hot melt adhesive is increased from its original dielectric constant to about 5.25.

In another embodiment, the composition of this tunable hot melt adhesive composition is tuned to achieve a dielectric constant in the range of about 2.6 to about 5.25. In yet another embodiment, the tunable hot melt adhesive composition is tuned to have a dissipation factor (Tan D) from about 0.014 to about 0.026, while still maintaining a viscosity of less than 13.0 Pa·s at 190° C. The composition comprises a polymer and a filler, as well as possibly other additives.

The polymer of the tunable hot melt adhesive composition can be either a thermoplastic polymer or a thermoset polymer. The polymer which is used in the tunable hot melt adhesive composition is dependent upon the final end use application of the tunable hot melt adhesive composition. Examples of suitable thermoplastic polymers include polyamides, polyolefins, polyurethanes, and ethylene vinyl acetate.

Other examples of thermoplastic polymers that may be used in the tunable hot melt adhesive composition include polyesters, poly (meth) acrylates, polycarbonates, polyvinyl alcohols, polynitriles, polyacetals, polyimides, polyarylketones, polyetherketones, polyhydroxyalkanoates, polycaprolactones, polysulfones, polyphenylene oxides, polyphenylene sulfides, polyacetates, liquid crystal polymers, fluoropolymers, ionomeric polymers, thermoplastic elastomers, and copolymers of any of them and combinations of any two or more of them.

Alternatively, the tunable hot melt adhesive composition can be formed from thermoset polymers so long as the desired viscosity, dielectric constant and dissipative factors of the composition are maintained. Examples of suitable thermoset polymers to be used in a tunable hot melt adhesive composition include but are not limited to epoxies, acrylates, cyanoacrylates, and reactive polyurethanes.

In addition to the polymer, the tunable hot melt adhesive composition includes fillers. The fillers that can be used in the tunable hot melt adhesive composition include but are not limited to: barium titanate, titanium dioxide, magnesium oxide, mica, aluminum oxide, and combinations thereof. The size of the filler should be selected so that the filler can be incorporated into the polymer to maintain the desired viscosity, dielectric constant and dissipation factor of the tunable hot melt adhesive composition. When using barium titanate, the particle size is in one embodiment, in the range of about 100 nm to about 2 microns. If titanium dioxide is used as the filler, the particle size is in the range of about 50 nm to about 50 microns in one embodiment. The filler is about 5% to about 50% by weight of the tunable hot melt adhesive composition. In an alternate embodiment, organic fillers such as polytetrafluoroethylene (PTFE) or polyethylene (PE) are added to the polymer to reduce the dielectric constant of the tunable hot melt adhesive composition.

The tunable hot melt adhesive composition may include additional additives provided that the desired viscosity, dielectric constant and the dissipation factor are maintained. Examples of conventionally employed additives include pigments, dyes, voiding agents, antistatic agents, foaming agents, plasticizers, radical scavengers, anti-blocking agents, anti-dust agents, antifouling agents, surface active agents, slip aids, optical brighteners, plasticizers, viscosity modifiers, gloss improvers, dispersion stabilizers, UV stabilizers, UV absorbers, antioxidants, lubricity agents, heat stabilizers, hydrolysis stabilizers, cross-linking activators, layered silicates, radio opacifiers, such as barium sulfate, tungsten metal, non-oxide bismuth salts, fillers, colorants, reinforcing agents, adhesion mediators, impact strength modifiers, antimicrobials, and any combination thereof. Such additives may be included in conventional amounts. Preferably, these additional additives are generally in the range of about 0.5% to about 10%, by weight of the composition of the tunable hot melt adhesive. These additive can be mixed into the tunable hot melt adhesive composition in any conventional manner desired, to achieve the desired properties in the hot melt adhesive.

In another aspect, the invention relates to the preparation of the tunable hot melt adhesive composition. The process comprises providing a polymer, providing at least one filler and optionally an additive. The polymer, and filler and optional additive are mixed together in particulate form using any conventional process to mix materials together. The mixing equipment can be any suitable equipment in the art of mixing concentrated solids. Examples of such suitable equipment include high speed Henschel mixers, ribbon blenders, shakers, extruders and the like. The fillers are configured to provide a polymer composition with appropriate physical properties, such as high heat resistance and high mechanical strength.

Prior to application, the tunable hot melt adhesive composition is heated and applied in a molten state to form the impedance mold 34. The viscosity and particle size of the tunable hot melt adhesive composition are optimized to provide the desired electrical characteristics, as previously discussed, and to appropriate flow characteristics to allow the tunable hot melt adhesive composition to properly fill all of the voids between the ground rakes 52, the ends 50 of the wires 20 (including the bent portions 52), the signal receiving pads 40 of the circuit board 32 and the ground planes 42 of the circuit board 32.

In addition, the rate of flow of the tunable hot melt adhesive composition when forming the impedance mold 34 must also be controlled. Based on the formulation of the tunable hot melt adhesive composition, the flow rate of the tunable hot melt adhesive composition may also be tuned or controlled to inhibit the formation of the air bubbles and to allow the tunable hot melt adhesive composition to be void free.

The temperature and the force of application of the tunable hot melt adhesive composition onto the wires 20 and the printed circuit board 32 must also be controlled or tuned based on the characteristics of the wires 20 and the printed circuit board 32. The application of the tunable hot melt adhesive composition must be done a temperature which is below the melting point of the components of the wires 20. The force or pressure at which the tunable hot melt adhesive composition is applied must below the force or pressure which would cause the wires 20 to deform or compress. Any such deformation of the bent portions 52 of the ends 50 of the wires 20 could cause an unwanted change in the signal transmission of the wires 20.

The present invention is directed to tunable hot melt adhesive composition in the form of an impedance mold 34 which can be adjusted or tuned to have a higher dielectric constant which is compatible with the necessary signal performance characteristics, including but not limited to impedance, propagation delay and crosstalk targets transmitted over and near the connection between the ends 50 of the wires 20 and the circuit board 32. The tunable hot melt adhesive composition in the form of an impedance mold 34 is tuned to be between the impendence of the ends 50 of the wires 20 and the impedance of the circuit board 32, thereby bridging the impedance difference between the components to allow better and more even flow of current from the ends 50 of the wires 20, across the impedance mold 34, and to the printed circuit board 32.

By altering the composition of the tunable hot melt adhesive composition in the form of an impedance mold 34 the dielectric characteristics of the impedance mold 34 and the connector assembly 10 can be tuned to minimize propagation delay of the signals as the signals are transmitted over the signal wires to the circuit board, thereby minimizing interference to the signal transmitted based on the signal speed, which in turn optimizes the signal transmission.

One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An electrical connector assembly comprising:

a printed circuit board;

signal wires for transmitting signals at a determined signal speed, the signal wires having ends which are connected to the printed circuit board;

an impedance mold which cooperates with the printed circuit and the signal wires, the impedance mold formed from a tunable hot melt adhesive composition having an initial dielectric constant;

wherein a dielectric constant of the tunable hot melt adhesive composition is tuned to have a higher dielectric constant as compared the initial dielectric constant in order to be compatible with the desired signal performance characteristics of the signals transmitted over the signal wires to the printed circuit board.

2. The electrical connector assembly as recited in claim 1, wherein ground members are positioned over the portions of the insulated wires.

3. The electrical connector assembly as recited in claim 2, wherein the ground members are encapsulated by the impedance mold.

4. The electrical connector assembly as recited in claim 3, wherein the ground members are positioned over bent portions of the ends of the wires.

5. The electrical connector assembly as recited in claim 4, wherein the ground members are mounted and secured the ground rake of the circuit board.

6. The electrical connector assembly as recited in claim 1, wherein the tunable hot melt adhesive composition can be formed from a thermoplastic or thermoset polymer.

7. The electrical connector assembly as recited in claim 1, wherein the tunable hot melt adhesive composition has a viscosity of less than 13.0 Pa·s at 190° C.

8. The electrical connector assembly as recited in claim 1, wherein the tunable hot melt adhesive composition is tuned to achieve a dielectric constant of the material to about 4.

9. The electrical connector assembly as recited in claim 8, wherein the tunable hot melt adhesive composition has a dissipation factor from about 0.014 to about 0.026.

10. The electrical connector assembly as recited in claim 1, wherein the tunable hot melt adhesive composition comprises a polymer.

11. The electrical connector assembly as recited in claim 10, wherein the tunable hot melt adhesive composition is either a thermoplastic polymer or a thermoset polymer.

12. The electrical connector assembly as recited in claim 11, wherein the thermoplastic polymers are chosen from the group consisting of: polyamides, polyolefins, polyurethanes, and ethylene vinyl acetate.

13. The electrical connector assembly as recited in claim 11, wherein the thermoset polymers are chosen from the group consisting of: epoxies, cyanoacrylates, and reactive polyurethanes.

14. The electrical connector assembly as recited in claim 1, wherein the tunable hot melt adhesive composition comprises at least one filler.

15. The electrical connector assembly as recited in claim 14, wherein the at least one filler is chosen from the group consisting of: barium titanate, titanium dioxide, magnesium oxide, mica, aluminum oxide, polytetrafluoroethylene, polyethylene and combinations thereof.

16. The electrical connector assembly as recited in claim 14, wherein the size of the at least one filler is selected to maintain the desired viscosity, dielectric constant and dissipation factor of the tunable hot melt adhesive composition.

17. The electrical connector assembly as recited in claim 14, wherein the at least one filler is about 5 to about 50 weight perfect of the tunable hot melt adhesive composition.

18. The electrical connector assembly as recited in claim 1, wherein the tunable hot melt adhesive composition comprises additives.

19. The electrical connector assembly as recited in claim 18, wherein the additional additives are in the range of about 0.5% to about 10% by weight of the tunable hot melt adhesive composition.

20. The electrical connector assembly as recited in claim 1, wherein the tunable hot melt adhesive composition comprises a polymer, a filler, and additives.

* * * * *